March 12, 1940.  T. R. HARRISON  2,193,095

MEASURING AND CONTROL APPARATUS

Filed Sept. 11, 1935  3 Sheets-Sheet 1

*INVENTOR.*
THOMAS R. HARRISON
BY *J. E. Hubbell*
*ATTORNEY*

March 12, 1940.    T. R. HARRISON    2,193,095
MEASURING AND CONTROL APPARATUS
Filed Sept. 11, 1935    3 Sheets-Sheet 2
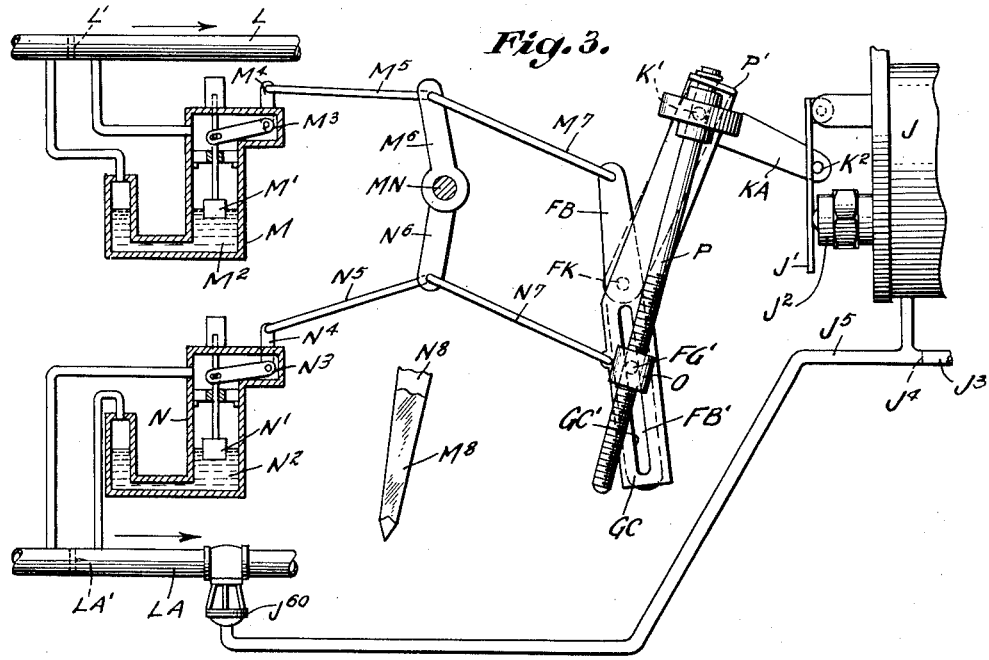
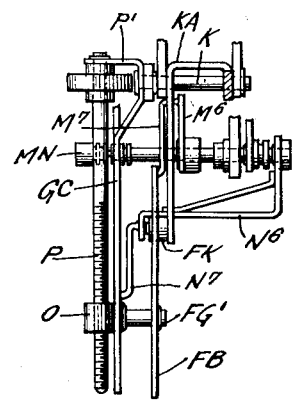
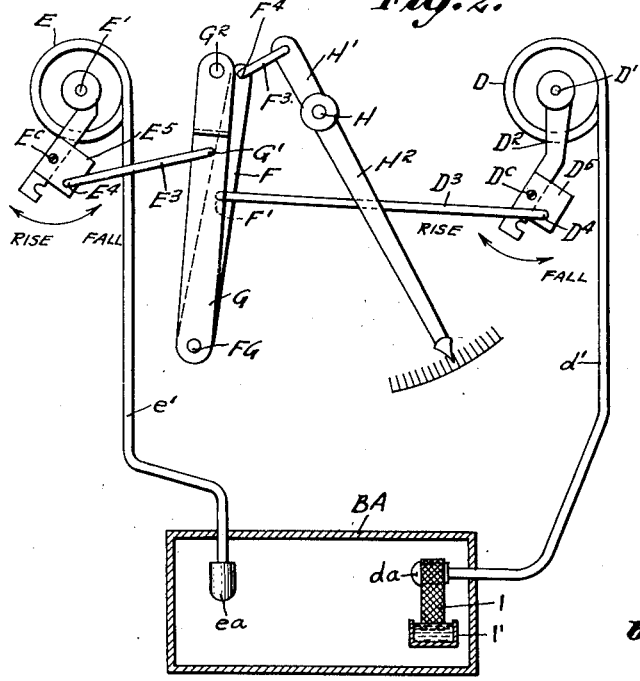
Inventor,
Thomas R. Harrison
by, John E. Hubbell
Att.

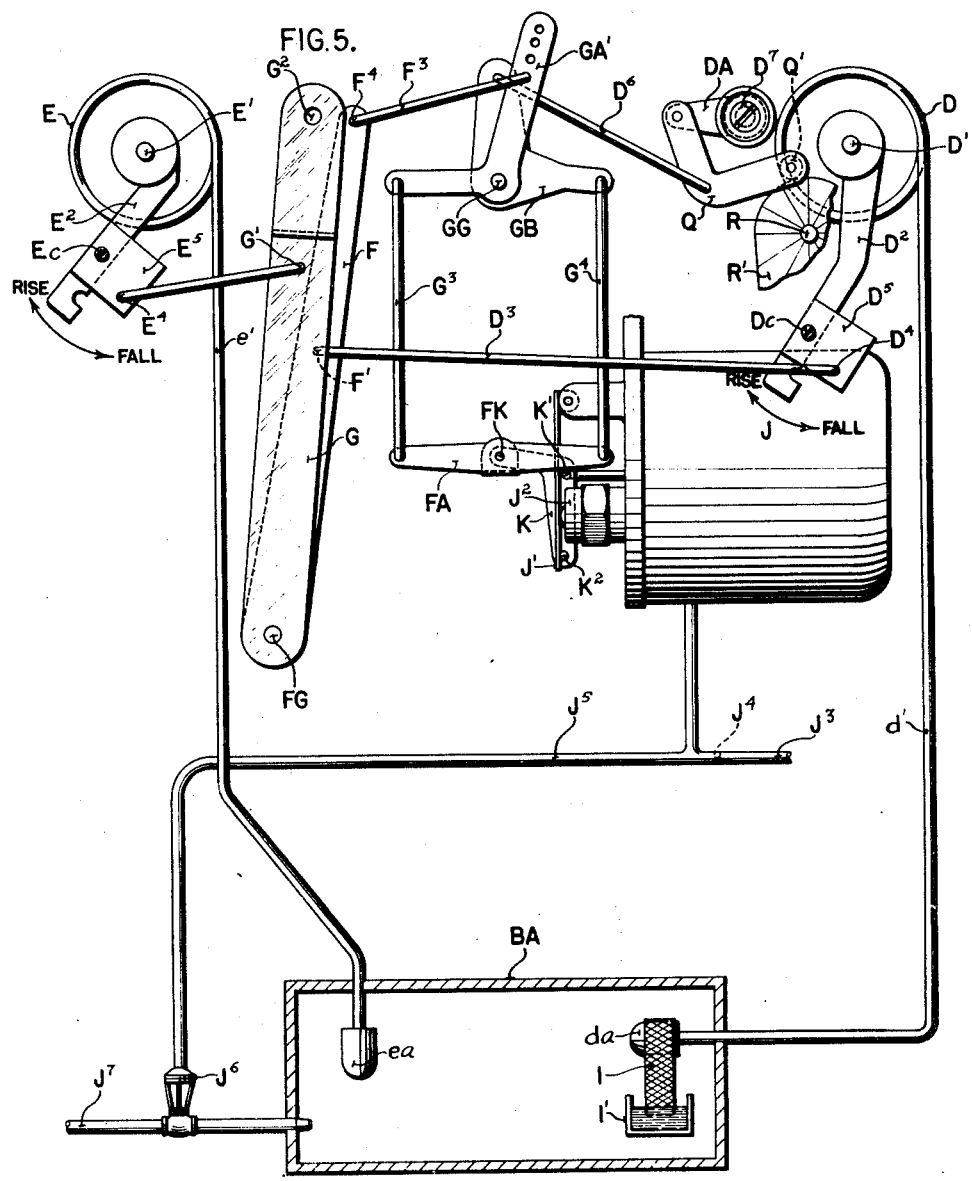

Patented Mar. 12, 1940

2,193,095

UNITED STATES PATENT OFFICE 2,193,095

MEASURING AND CONTROL APPARATUS

Thomas R. Harrison, Wyncote, Pa., assignor to The Brown Instrument Company, Philadelphia, Pa., a corporation of Pennsylvania Application September 11, 1935, Serial No. 40,103

4 Claims. (Cl. 74—1)

The general object of the present invention is to provide improved mechanism primarily devised and adapted for use in and as a part of measuring and control apparatus in which conjoint effect is given to variations in two or more variable conditions.

A more specific object of the invention is to provide improvements in apparatus for relating or maintaining a predetermined ratio between a plurality of rates of fluid flow, but the invention comprises combinations well adapted for use in apparatus serving other purposes. My invention in all of its forms is characterized by its mechanical simplicity, and, in particular, by lever and link arrangements employed with resultant avoidance of lost motion and friction losses.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have diagrammatically illustrated and described various embodiments of my invention.

Of the drawings:

Fig. 2 is an elevation partly in section of essential parts of a humidity meter;

Fig. 3 is an elevation partly in section of apparatus for maintaining a predetermined ratio between two rates of fluid flow;

Fig. 4 is a view taken at right angles to, and illustrating a portion of the apparatus shown in Fig. 3;

Fig. 5 is an elevation in section of essential parts of humidity control apparatus including features illustrated in Fig. 2.

Figure 1:
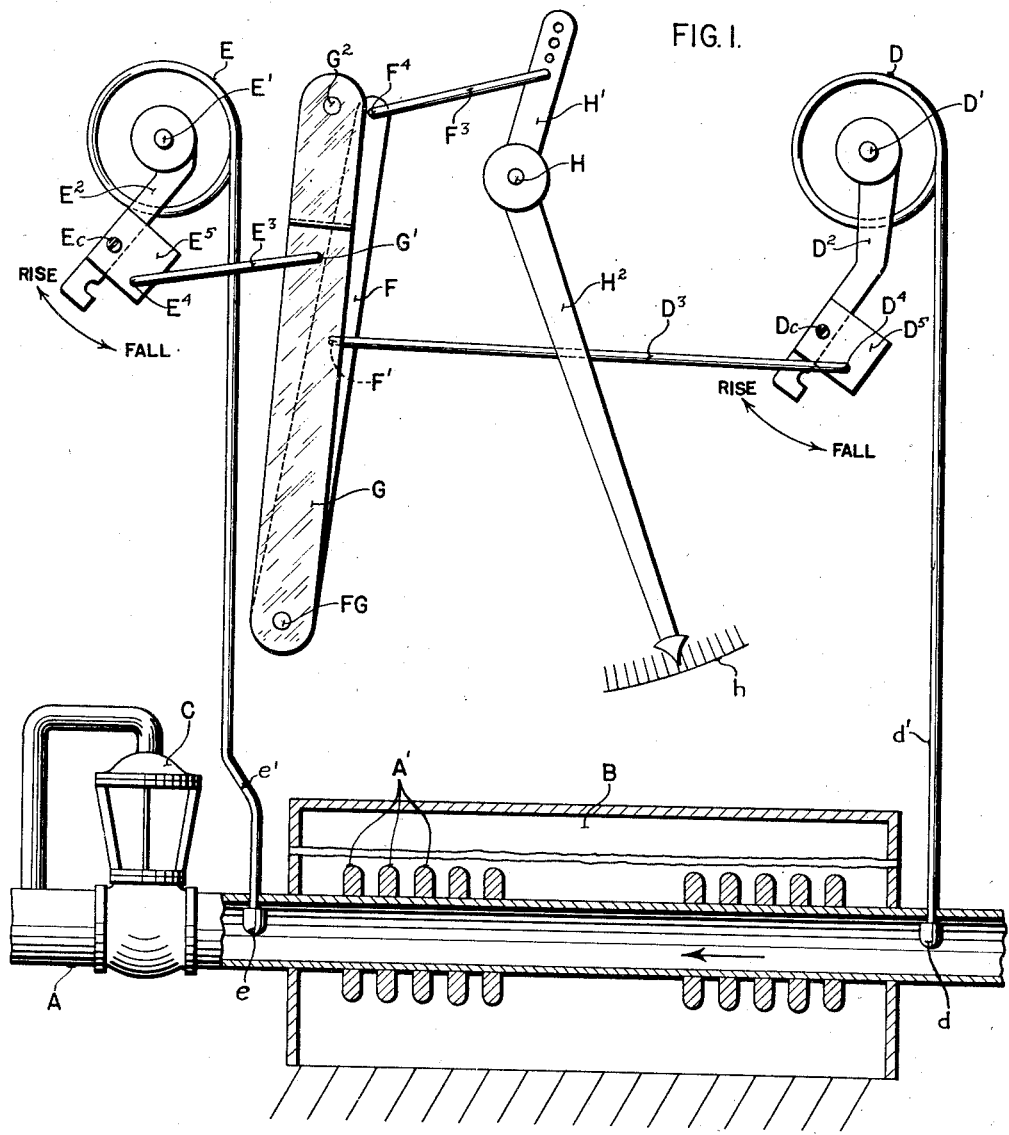
Fig. 1 is an elevation, partly showing in section, of essential parts of a heat meter.

In Fig. 1, I have diagrammatically illustrated a form of embodiment of the invention, which is adapted to measure the amount of heat absorbed in an enclosed space B from a conduit A through which a heating fluid, such as steam or hot water, flows in the direction indicated by the arrow. Fins or circumferential ribs A' on the portion of the conduit A within the space B, are provided to increase the heat transfer from the fluid within the conduit A into the space B. A flow controller C is provided to variably throttle the conduit A as required to maintain a constant rate of flow therethrough.

The fluid temperature drop in the portion of the conduit A traversing the space B, is measured by temperature responsive elements $e$ and $d$ in the conduit A at the exit and entrance ends, respectively, of said portion. Each of the elements $d$ and $e$ may be, and is shown as, the bulb of an expansible fluid thermometer. The bulb $d$ is connected by a capillary tube or pipe $d'$ to the stationary end of a Bourdon tube D, having its movable end connected, and giving angular movement, to an axial shaft $D'$ which carries an arm $D^2$. The bulb $e$ is similarly connected by a tube or pipe $e'$ to the stationary end of a Bourdon tube E having its movable end connected to an axial shaft $E'$ carrying an arm $E^2$. The two shafts $D'$ and $E'$ are arranged side by side, and the arms $D^2$ and $E^2$ extend away from the same side of the plane including the axes of said shafts, and each arm turns clockwise as the temperature of the corresponding bulb $d$ or $e$ increases.

The arms $D^2$ and $E^2$ conjointly actuate means for exhibiting the difference between the temperature to which the bulbs $d$ and $e$ are subjected. Those means comprise a floating lever F and a lever G having a fixed fulcrum pivot $G^2$, and carrying the fulcrum pivot FG for the lever F. The arm $D^2$ acts on the lever F through a link $D^3$, pivotally connected to the arm at $D^4$, and to the lever at $F'$. Similarly, arm $E^2$ acts on lever G through a link $E^3$ pivotally connected at $E^4$ to the arm $E^2$, and to the lever G at $G'$. At its end remote from its fulcrum pivot FG, the lever F is connected by a link $F^3$ to an arm $H'$ carried by a rock shaft H. The latter carries a pointer or pen arm $H^2$ cooperating with a scale, or scaled surface, $h$ to exhibit the changes in angular position of the arm H.

In the normal operating range, the movements of the fulcrum pin FG and point $F'$ are generally, or approximately, parallel. As shown, the fixed pivot $G^2$, which is parallel to, and slightly above the plane of the shafts $E'$ and $D'$, and the point $F^4$, at which the link $F^3$ is pivotally connected to the floating lever F, is also above that plane, and relatively close to the pivot $G^2$. As shown also, the distance between the fixed suspension pivot $G^2$ for the lever G, and the fulcrum pivot FG for the floating lever F, is appreciably greater than any of the lever arm lengths, $D'$—$D^4$, $F^4$—$F'$, $G^2$—$G'$, and $E'$—$E^4$.

For the purposes of the apparatus of Fig. 1, the effect on the angular position of the rock shaft H, of movement of the floating lever F about its fulcrum pivot FG produced by a given change in either direction of the temperature of the bulb $d$, should be neutralized, by the movement of the lever G about its suspension pivot $G^2$ produced by an equal change in the same direction of the temperature of the bulb $e$, and the changes in angular position of the shaft H should be in substantial linear proportion to the changes in the algebraic sum of a positive quantity proportional to the temperature of the bulb $d$, and a minus quantity proportional to the temperature of the bulb $e$.

As will be readily apparent to those skilled in the art, those purposes may be served by giving suitable relative proportions to the lever arm lengths of the arrangement shown in Fig. 1. So proportioned, the arm $H^2$ in conjunction with a suitably graduated scale part $h$ will exhibit the difference between the two bulb temperatures in any desired temperature units.

In Fig. 2 I have shown apparatus for measuring the relative humidity in a space BA which comprises theremometer bulbs $da$ and $ea$, and parts associated with those bulbs like, and designated by the same reference symbols as, the parts associated with the bulbs $d$ and $e$ of Fig. 1. The bulbs $da$ and $ea$ each differ from the bulbs $d$ and $e$ first described, only as may be necessary to adapt them to use with different temperature ranges, and as a result of the fact that the bulb $da$ forms part of a so-called wet bulb thermometer and is kept moist by suitable means. The conventionally illustrated means for that purpose comprises a wick I extending about the bulb $da$ and dipping into a water containing receptacle I'. In the instrument of Fig. 2, however, the relative proportions of different parts of the lever and link arrangement through which the deflection of the arm $H^2$ is jointly controlled by the deflection of the arms $D^2$ and $E^2$, must differ from those shown in Fig. 1, in order that the position of the arm $H^2$ relative to scale $h$ may indicate the relative humidity of the atmosphere in the space B.

For that purpose, the parts are proportioned with reference to the well known psychrometric law, that both the dry bulb temperature, and the difference between the wet and dry bulb temperatures, must be taken into account in determining relative humidity from those measurements, and that with one of those temperatures fixed, the relative humidity change resulting from a given change in the other temperature, is greater when the fixed temperature is the dry bulb temperature than when it is the wet bulb temperature. In consequence, the apparatus shown in Fig. 2 has its lever arms so relatively proportioned that a given dry bulb temperature change will operate through the arm $E^2$ and lever G to give a smaller angular movement to the rock shaft H, than the same change in the wet bulb temperature would produce through the arm $D^2$ and floating lever F except when the temperatures of the wet and dry bulbs are the same which will occur at 100% relative humidity. At 100% relative humidity points $G^2$ and $F^4$ will coincide. The deflection of the arm $H^2$ from the left hand or zero humidity end of the scale $h$ of Fig. 2, for a given difference between the wet and dry bulb temperatures, will thus be increased or decreased by a decrease or increase, respectively, in the temperature of the dry bulb $ea$, as is required by the above mentioned psychrometric law.

Fig. 3 illustrates an arrangement for regulating one variable quantity or condition, which may be called a dependent variable, as required to maintain that quantity or condition in a predetermined proportional relation with a second variable quantity or condition, which may be called an independent variable, and upon the value of which the controlling arrangement has no direct effect. In the arrangement shown, the independent variable is the rate of fluid flow through a conduit L, and the dependent variable is the rate of fluid flow through a conduit LA. The ratio controlling means comprises separate means for measuring each variable, and means jointly dependent upon the measurements separately effected by the two measuring means, for regulating the dependent variable.

The conventionally illustrated means for measuring the flow through the conduit L, comprises a measuring orifice L' in the conduit L, and pipe connections for transmitting the pressures at the two sides of the orifice to the upper ends of the legs of a U-tube manometer M. A float M' in one leg of the manometer is raised and lowered as the flow through the conduit L increases and diminishes by the resultant displacement of the manometer sealing liquid $M^2$. The float M' is connected by an arm within the manometer chamber to a rock shaft $M^3$ which is journalled in the latter, and is oscillated by rising and falling movements of the float. Externally of the manometer chamber an arm $M^4$ is secured to the shaft $M^3$. Through a link $M^5$, oscillatory movements of the arm $M^4$ give oscillatory movements to an arm $M^6$ which turns about the axis of a supporting pivot or shaft MN. The oscillatory movements of the arm $M^6$ give corresponding movements to the upper end of a floating lever FB through a connecting link $M^7$. The flow through the conduit LA is measured, and variations in that flow give movement to a lower portion of the lever FB, through parts LA' and N—$N^7$, corresponding respectively to the parts L' and M—$M^7$, the part $N^6$ being mounted to oscillate about the axis of the supporting shaft MN. The manometer N has its legs so connected to the conduit LA, however, that an increase of the flow through that conduit lowers the float N' and turns the shaft $N^3$ counter-clockwise, while an increase in the flow through the conduit L turns the shaft $M^3$ clockwise. Indicating or recording pen arms $M^8$ and $N^8$ may be connected to the arms $M^6$ and $N^6$, respectively, to indicate or record the rates of flow through the conduits L and LA on a suitable scale or record surface, not shown in Fig. 4.

The link $N^7$ directly connects the arm $N^6$, not to the floating lever FB, but to a lever GC, which turns about the stationary axis of a pivot pin K' forming the fulcrum support for the lever GC. The fulcrum for the floating lever FB is formed by a pivot pin FG' adjustably mounted on the lever GC. As shown, the pin FG' is directly carried by a part O, which is adjustable to vary the distance between the pivot pin FG' and the point of connection of the lever FB and link $M^7$. As shown, the pivot pin FG' extends through an elongated slot FB' in lever FB and through a slot GC' in the supporting lever GC. The part O is shown as a nut through which an adjusting screw P is threaded. The latter is swivelled at its upper end in a bracket P' mounted on the pivot K' and free to turn about the axis of the latter.

Such turning movements are required to enable the screw P to turn with the lever GC with any given adjustment of the part O and pivot pin FG', and are necessary, also, to permit the screw P to turn about the axis of the K' relative to the lever GC, when the screw P is rotated about its own axis to adjust the nut O and pivot pin FG' along the slot GC' which, in the form shown, is not radial to the pivot pin K'.

The adjustment of the pivot pin FG' along the slot GC', and consequently along the slot FB', varies the ratio of the flow through the conduit LA, relative to the flow through the conduit L, which the apparatus tends to maintain. That ratio is increased or decreased as the distance between the pin FG' and the pivotal connection of the lever FB to the link M⁷ is increased or decreased, as a result of the fact that the lever FB exerts its control effects through a pivot pin FK which is intermediate said pivotal connection and the pivot pin FG', which forms the fulcrum for the lever FB.

The movements of the lever FB create control effects in consequence of the fact that the pivot pin FK connects lever FB to a lever KA, turning about the pivot pin K' and carrying a pin K², which adjusts the flapper valve J' of a fluid pressure control device or unit J including a flapper valve controlling a bleed orifice, which may take a wide variety of known forms. As shown in Fig. 3, the flapper valve J' is biased for counterclockwise movement into the position in which it throttles the discharge to the atmosphere through the bleed orifice in a nozzle J², of air under pressure supplied to a pressure chamber included in the device J. As shown, the pin K² bears against the right hand side of the valve J', so that the latter is given opening adjustments or permitted closing adjustments as the lever KA is turned clockwise or counterclockwise within its operating range of movement.

The movements of the valve J' toward and away from the nozzle J² increase and diminish the control pressure within the pressure chamber included in the device J. The latter receives air supplied under a suitably constant pressure by a pipe J³ communicating with the pressure chamber of the unit J through a restricted orifice J⁴. The arm of the lever KA connected to the pivot pin FK, serves as a radius bar or arm, and prevents bodily movement of the lever FB downward under the action of gravity when the parts are arranged as shown. The variable pressure in the control chamber of the device J is transmitted through the pipe J⁵ to the pressure chamber of a motor pressure valve J⁶⁰, thereby actuated to variably throttle flow through the conduit LA. With the arrangement illustrated, an increase in the flow through the conduit L, or a decrease in the flow through the conduit LA, will give a closing adjustment to the valve J'. Conversely, a decrease in the flow through conduit L, or an increase in the flow through the conduit LA, will given an opening adjustment to the valve J'. For the maintenance of the desired flow ratio, the valve J⁶⁰ must act, therefore, in the direction to increase or decrease the flow through the conduit LA, accordingly as the control pressure transmitted to the valve J⁶⁰ through the pipe J⁵, is increased or decreased.

The apparatus shown in Fig. 5 comprises relative humidity measuring means, including levers F and G and adjusting provisions for those levers, which are identical with the levers F and G and actuating means therefor shown in Fig. 2. In Fig. 5, however, the link F³ acts on control unit or device JA, which may be exactly like the previously described fluid pressure control device J, and as shown is an air actuated controller of the type illustrated in Patents Nos. 2,124,946 and 2,125,109, each granted July 26, 1938, on a joint application of F. W. Side and myself. The device JA is like the previously described device J, in having its flapper valve J' biased for movement in the direction to throttle the bleed orifice in the nozzle J², and in the association of the device with an air supply pipe J³ including a restricted orifice J⁴ and a pipe J⁵ transmitting the control pressure to the pressure chamber of a fluid pressure motor valve J⁶ in a moisture supply line J⁷ leading to the chamber BA.

As shown in Fig. 5, the lever FA is a substantially horizontal floating lever supported by suspension links G³ and G⁴, respectively, connected at their lower ends to the opposite ends of the lever FA. The upper end of the link G³ is connected to a horizontally disposed arm of a bell crank lever GA, which is mounted on a pivot pin GG approximately midway between the links G³ and G⁴, and which has an uprising arm GA' connected to the upper end of the lever F by a link F³. As shown, the link F³ may be arranged to act on the lever GA with different leverages by connecting it into one or another of a plurality of holes formed in the arm GA' at different distances from the axis GG.

The upper end of the link G⁴ is connected to the horizontally disposed arm of a bell crank lever GB also journalled on the pivot GG. The lever GD has an uprising arm connected by a link D⁶ to means which determine the relative humidity which the apparatus is intended to maintain. Said means, which may be designated as a control point adjusting mechanism, comprises parts Q, DA and R. The link D⁶ is directly connected to the part Q, which is a lever, intermediate the ends of the latter. One end of the lever Q is pivotally connected to a crank arm DA adapted to be angularly adjusted manually about an axis of a supporting pivot portion D⁷, shown as provided with a kerf for engagement by a screw driver conveniently employed in angularly adjusting the device DA. Ordinarily, the device DA includes a friction washer or the like for holding its arm to which the link D⁶ is connected in any angular position into which the arm may be adjusted.

The other end of the lever Q carries the supporting shaft for a roller Q', which rides on an edge cam R' carried by a constantly rotating timing shaft R. As the rotation of the cam R varies the distance between the roller Q' and the shaft R', the lever GB is angularly adjusted to thereby vary the control point, or normal value of the control pressure maintained by the device J, in accordance with a program determined by the contour and rotative speed of the cam R. The manual adjustment of the device DA varies the said control point or normal value which the timing shaft R' and cam R tend to maintain at any particular instant.

The up or down movement of either end of the lever FA effected by a vertical adjustment of the corresponding link G³ or G⁴, gives rising and falling movements to a pivot pin FK pivotally connecting the lever FA midway between its ends to one arm of a bell crank lever K pivoted to turn about a relatively stationary pivot axis K' and having a second arm carrying a pin K² normally bearing against the right hand side of the valve J' adjacent the lower end of the latter. In Fig. 5 the control pressure transmitted through the pipe J⁵ to the control valve J⁶ regulates the supply of moisture to the chamber BA as required to maintain a predetermined relative humidity in the chamber BA which is dependent upon, and is controlled by the control point adjusting devices DA, Q, and R.

When the relative humidity in the space DA of Fig. 5 diminishes below the predetermined value, the control pressure to which the valve $J^6$ is subjected is decreased, thereby diminishing the throttling effect of the valve $J^6$ and increasing the supply of moisture through the pipe $J^7$ to the space and restoring the relative humidity therein to its normal value. Converse actions occur when the relative humidity in the space BA increases above its normal value. The inclusion of the lever Q and timing or program cam R in the apparatus of Fig. 5, makes it possible to vary the relative humidity maintained at different hours of the day, or at different periods or stages in an industrial process, as may sometimes be desirable.

As will be apparent, each of the forms of my invention illustrated and described herein, comprises a floating lever F, FB, and a lever member G, or GC, which is also a lever and has a fixed fulcrum axis and supports, and by its movements, moves a fulcrum for the floating lever. The floating lever is connected to the fulcrum supporting lever, in each of the forms shown, by a pivot pin. In each of the forms illustrated, the fulcrum supporting lever is turned about a fixed fulcrum axis, in accordance with changes in one condition, and the floating lever is turned about its movable fulcrum axis in accordance with the changes in a second condition. Each lever is given its said turning movements in response to changes in the corresponding controlling condition by means automatically responsive to that condition, and including a link moved in the direction of its length on a change in the corresponding condition, and pivotally connected at one end directly to the lever.

In all of the forms of the invention illustrated, the floating lever actuates a measuring and/or controlling means pivotally connected to the floating lever at a point displaced both from the fulcrum axis of the floating lever and from the point at which the latter is connected to the means turning the floating lever about is fulcrum. The movements given the first mentioned actuating point are proportional, therefore, to the algebraic sum of the movements given the axis of the floating lever fulcrum, and the turning movements about that axis given to the floating lever.

The invention is characterized in particular by the mechanical simplicity of the provisions for producing an effect which is proportional to the algebraic sum of two variable conditions or quantities, and especially, by the use of lever and link arrangements for producing that effect with a resultant reduction to a practical minimum, of the lost motion and friction losses inherent in apparatus comprising co-acting relatively movable parts.

It is noted, moreover, that while the particular lever arm adjusting provisions including the screw P shown in Fig. 3, are desirable for use in the particular mechanism illustrated in that figure, simpler provisions for adjusting the effective length of lever arms for calibration purposes may be employed wherever necessary or desirable in all of the forms of apparatus illustrated. In actual apparatus of the form illustrated in Fig. 1, for example, provisions will ordinarily be desirable, as those skilled in the art will realize, for varying the distance between the shaft E' and the point $E^4$, and between the shaft D' and the point $D^4$, and such adjustment may be made as illustrated in Figs. 1, 2 and 5 by manually moving member $D^5$ or $E^5$ along arm $D^2$ or $E^2$ respectively, toward and away from shafts D' and E' and clamping the member in its adjusted position by means of screw Dc or Ec. Novel features not claimed herein of the heat meter illustrated in Fig. 1, and of the humidity responsive apparatus illustrated in Figs. 2 and 5, are claimed in my respective divisional applications, Serial Nos. 253,133 and 253,134, both filed Jan. 27, 1939.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that, in some cases, certain features of my invention may be used to advantage without a corresponding use of other features.

Having now described my invention, what I claim as new and desire to secure by Letters Patent, is:

1. Control apparatus including a control element pivoted to turn about a fixed axis to different positions to produce correspondingly different control effects, and adjusting means for said element comprising a floating lever part pivotally connected to and supported by said element, a member part pivoted to turn about a fixed axis, means supported by one and in sliding engagement with the other of said parts and providing a movable fulcrum for said lever part, means responsive to one variable condition acting on said lever part at a point displaced from said fulcrum and from the pivotal connection of said element and lever part, and means responsive to a second variable condition acting on said member part at a point displaced from said fulcrum, pivotal connection, and first mentioned point.

2. Apparatus for producing an effect equal to the sum of effects proportional to two variable conditions, comprising in combination an upright floating lever, an upright member, a pivotal suspension connection to an upper portion of said member permitting angular movement of said member about the stationary axis of said connection and preventing non angular movement of said member relative to said axis, a pivotal connection between said lever and a lower portion of said member constituting a movable fulcrum for said lever, means automatically responsive to one of said conditions and including a link transverse to said lever and moved in the direction of its length by a change in said one condition and having one end directly pivoted to said lever at a point thereof displaced from said fulcrum for moving said point in accordance with changes in said one condition, and means automatically responsive to the second of said conditions and including a link transverse to said member and moved in the direction of its length by a change in said second condition and having one end directly pivoted to said member for turning the latter about said axis to thereby move said fulcrum in the general direction of the movement given said point by the first mentioned means and in accordance with changes in said second condition.

3. Control apparatus including a control element adjustable to different positions to produce correspondingly different control effects and adjusting means for said element comprising an upright floating lever pivotally connected to said element, an upright member, a pivotal suspension connection to an upper portion of said member permitting angular movement of said member about the stationary axis of said connection and preventing non angular movement of said member relative to said axis, a pivotal connection between said lever and a lower portion of said member constituting a movable fulcrum for said floating lever, means automatically responsive to one variable condition acting directly on said lever at a point displaced from said fulcrum and from said second mentioned pivotal connection, means automatically responsive to a second variable condition acting directly on said member at a point displaced from said fulcrum, second mentioned pivotal connection, and first mentioned point, and means for varying the relative distances between said fulcrum and said points.

4. Control apparatus including a control element adjustable to different positions to produce correspondingly different control effects and adjusting means for said element comprising a floating lever pivotally connected to said element, a member pivoted to turn about a fixed axis and providing a movable fulcrum for said floating lever, said floating lever and member comprising adjacent portions, one of which is formed with a longitudinal slot, a pin extending through said slot and forming said fulcrum, a member mounted on the other of said portions and adjustable longitudinally thereof and carrying said pin, means automatically responsive to one variable condition acting on said lever at a point displaced from said fulcrum and from the pivotal connection of said element and floating lever, means automatically responsive to a second variable condition acting on the first mentioned member at a point displaced from said fulcrum, pivotal connection, and first mentioned point, the relative distances between said fulcrum and said points being varied by adjustment of the second mentioned member longitudinally of the portion on which it is mounted.

THOMAS R. HARRISON.